Patented Mar. 21, 1933

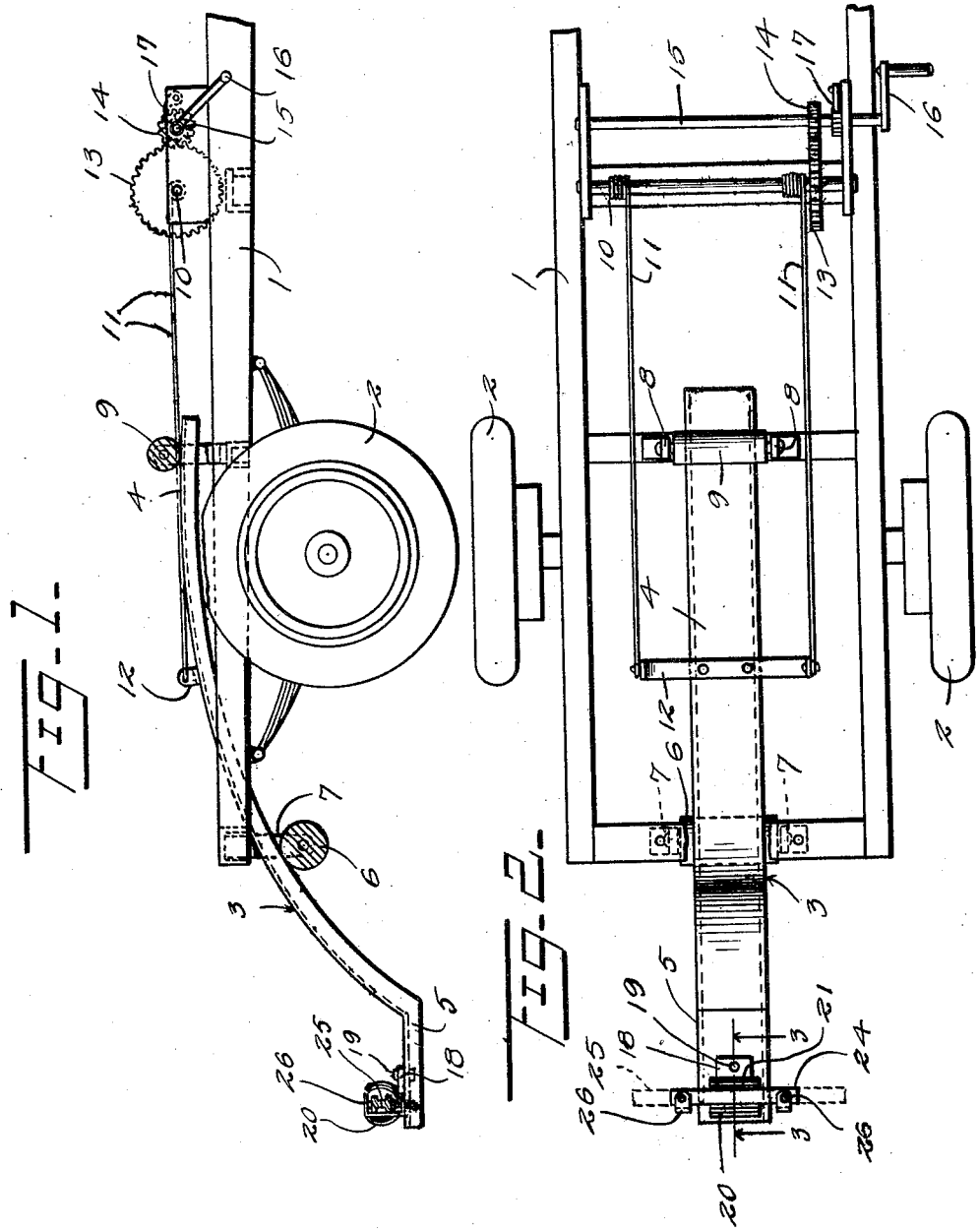

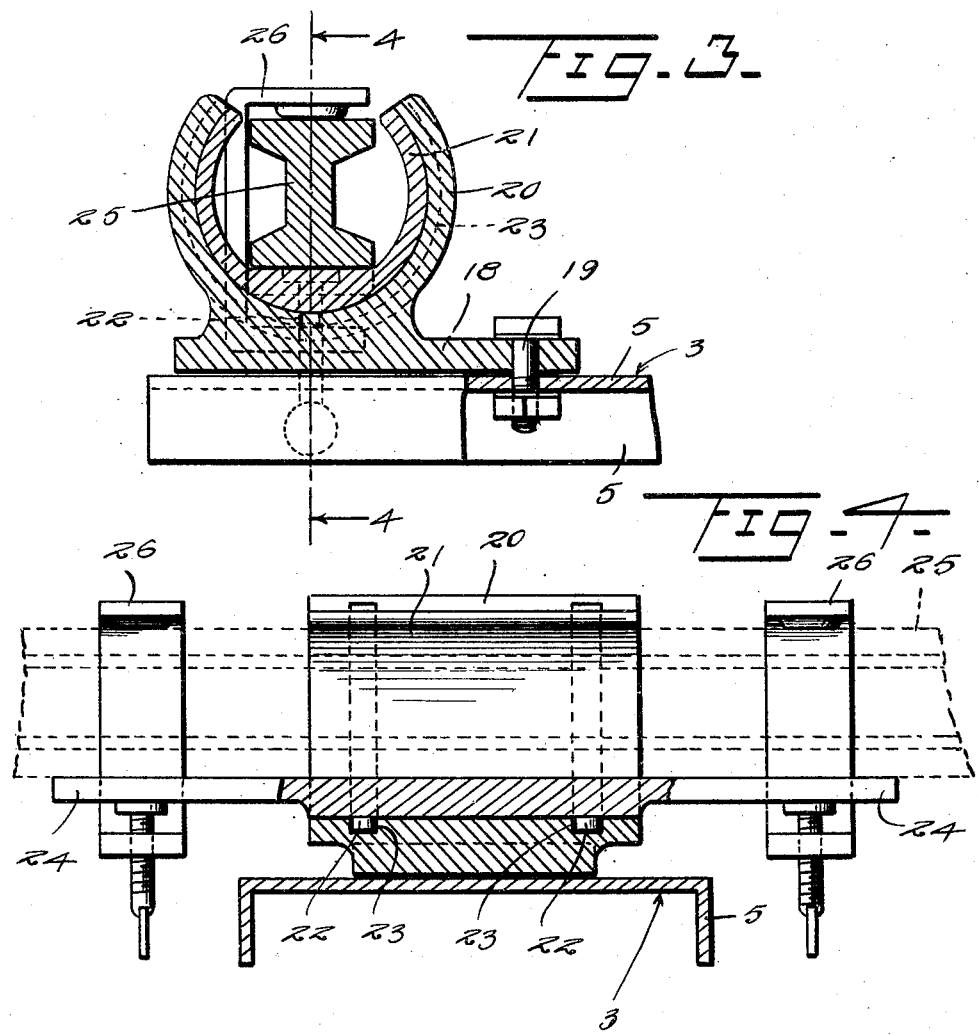

1,902,212

UNITED STATES PATENT OFFICE

FRED BONGE, OF SEATTLE, WASHINGTON

TOWING DEVICE

Application filed October 20, 1931. Serial No. 569,998.

This invention relates to towing devices, and pertains particularly to an improved tow bar structure for use upon tow cars.

The primary object of the present invention is to provide a towing attachment for tow cars of the character commonly employed for towing motor vehicles which will lift the front end of a vehicle free from the ground and at the same time draw it forwardly toward the tow car so that it will be maintained in the proper position with respect to the tow car for easy transportation.

Another object of the invention is to provide a tow bar structure having a novel means for coupling a motor vehicle axle therewith whereby free universal movement between the said axle and the tow bar is permitted.

A still further object of the invention is to provide a novel means for securing the front axle of the towed car to the tow bar, whereby lateral movement of the towed car axle with respect to the tow bar is prevented.

The invention will be best understood from a consideration of the following detailed description taken in connection with the accompanying drawings forming a part of the present invention with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 shows the rear portion of a motor vehicle chassis, in side elevation, showing the structure embodying the present invention attached thereto;

Figure 2 is a top plan view of the structure shown in Figure 1;

Figure 3 is a sectional view taken on the line 3—3 of Figure 2;

Figure 4 is a sectional view taken on the line 4—4 of Figure 3.

Referring now more particularly to the drawings, wherein like numerals of reference indicate corresponding parts throughout the several views, the numeral 1 indicates the chassis frame of a tow car, upon which the towing device embodying the present invention is mounted, the rear supporting wheels for the frame being indicated by the numeral 2.

The present towing device consists of a beam which is indicated generally by the numeral 3 and which is preferably of angle iron construction, and which is longitudinally arcuate throughout the major portion 4 and terminates at its rear end in a short straight portion which is indicated by the numeral 5. The arcuate portion 4 of this beam extends over a roller support 6 which is mounted between suitable hangers 7 secured to the underside of the chassis frame upon the longitudinal center and at the rear thereof, as shown in Figure 2.

At a suitable point between the chassis frame there are mounted the upstanding bearing arms 8, between which is rotatably supported a roller 9. The forward end of the curved portion 5 of the beam extends beneath and engages this roller.

The roller 6 normally engages the beam at a point substantially midway between its ends in which position the beam has its straight rear end portion in position to receive the axle, either front or rear, of the motor vehicle which is to be supported thereon. It will thus be seen that when the beam is drawn forwardly, the forward end will ride downwardly beneath the roller 9 and thus raise the straight rear end portion 4 thereof as the beam passes over the rear supporting roller 6.

In order to effect the drawing forward of the beam 3, there is mounted upon the chassis frame at a point forwardly of the roller 9, a shaft 10 which is employed as a cable drum. A pair of cables, each of which is indicated by the numeral 11, each has one end connected with the shaft 10, while its other end is connected with one end of a bar 12 which is secured transversely of the beam 3 at a point rearwardly of its forward end and approximately midway between the rollers 6 and 9. The rotation of the shaft 10 is obtained through the medium of the shaft 15 which at one end carries a crank 16, and the two gears 13 and 14, the first of which is mounted on the shaft 15 while the other is mounted upon the shaft 10, and the mechanism is secured in any position by a pawl and ratchet 17, the pawl being mounted upon the chassis and engaging the ratchet which is upon the shaft 15 as shown.

It will be seen that upon rotation of the shaft 10 to wind the cables 11 thereon, the beam 3 will be drawn forwardly, the forward end passing downward beneath the gear mechanism and the rear end being lifted the proper distance above the ground for the support of a vehicle connected therewith.

Mounted upon the top of the beam 3 at the rear end is a plate 18 which is swivelly coupled at one end with the supporting beam by the bolt 19. Adjacent the other end of this plate from the bolt 19, there is mounted thereon the transversely extending cradle 20 in which is positioned an open or split sleeve 21. The sleeve and cradle are coaxially disposed so that the sleeve may turn freely within the cradle and the longitudinal movement of the sleeve through the cradle is prevented by pin members 22 which project from the underface thereof into arcuate grooves 23 formed in the inner surface of the cradle.

The sleeve 21 has a flat arm 24 extended from each end thereof over which an axle of a machine being towed, positions when the axle is placed in the sleeve as shown in Figure 3, an axle being shown in position in the sleeve and indicated by the numeral 25. The axle 25 is secured to the sleeve to prevent its longitudinal movement therethrough, by means of suitable clamps 26 which engage about the axle and the arms 24 and thus secure the same together as illustrated in Figure 4. It will thus be seen that the cradle may turn freely about the axle after the same has been placed in the sleeve, but the axle cannot move through the sleeve while the machine of which it forms a part, is being towed.

In the operation of the present device, the tow bar or beam 3 is disposed in the position illustrated in Figure 1 with the rear end thereof arranged to receive the axle 25 of the machine to be moved. After the axle has been secured in the sleeve by means of the clamps 26, the crank 14 is operated to draw the beam or bar 3 forwardly so as to cause the curved portion to ride up over the roller 6 and thus raise the rear end thereof.

It will, of course, be readily seen that there will be some turning of the axle 25 relative to the cradle 20, when the tow bar is being drawn in in this manner, and this is permitted by the sleeve 21 which turns in the cradle with the axle. When the tow car is in operation and turns are made, the plate 18 will swing freely about the bolt 19 to permit a free articulation between the two machines.

From the foregoing description, it will be readily seen that the device embodying the present invention is of a simple character but which is also of a design which will facilitate the ready coupling of a damaged car with the tow car upon which the device is mounted. In addition, the coupling between the damaged car and the tow car is such that free relative movement is permitted therebetween. It will also be noted that with the present towing device, very little of the structure projects above the top of the tow car chassis frame so that a body might readily be mounted on the chassis frame for employing the tow car for other purposes.

I claim:—

1. A towing device for use on a vehicle, comprising an elongated tow bar having a curved or arcuate portion and a straight portion at one end, roller means normally engaging the arcuate portion of the bar for supporting the same beneath the body of the vehicle, said straight portion being extended rearwardly from the vehicle, means carried by the vehicle having engagement with the end of the curved portion for drawing the bar over said roller to raise the straight end portion, and means for coupling an axle of a vehicle with the straight end of the bar.

2. A towing mechanism comprising a wheeled structure, a roller suspended from the under side of said structure, a bar extending longitudinally of the structure over said roller and having a downwardly directed rear portion terminating in a straight rear end, means carried by the structure for drawing the downwardly directed rear portion over said roller, and means carried by the straight rear end portion of the bar for coupling an axle of a vehicle therewith.

3. A towing mechanism comprising a wheeled structure, a roller suspended from the under side of said structure, a bar extending longitudinally of the structure over said roller and having the major portion thereof defining a longitudinally extending arc, said arcuate portion passing over the roller and having one end directed rearwardly and downwardly, means carried by the structure for drawing the other end of the arcuate portion of the bar forwardly, and a cradle pivotally mounted upon the bar at the downwardly and rearwardly directed end thereof for the reception of the axle of a vehicle.

4. A towing structure of the character described, comprising a wheeled structure, a support carried by the structure at one end, a towing bar mounted on said support and designed to have longitudinal movement thereover, said bar being of longitudinally arcuate design through the major portion of its length and extending across said support, the convex side of the bar being directed downwardly, the rear end of the curved portion of said bar terminating in a straight terminal portion normally disposed adjacent the ground, a guide carried by the structure under which the forward end of the bar passes, mechanism carried by the structure having connection with the bar to shift the same longitudinally forwardly of the structure to raise the straight terminal portion, and means carried by the straight terminal portion of the bar for coupling an axle of a vehicle therewith.

5. A towing structure of the character described, comprising a wheeled structure, a towing bar of longitudinally arcuate design, means carried by said wheeled structure for supporting said towing bar in a position extending longitudinally thereof, said supporting means permitting the longitudinal shifting of the towing bar, means carried upon the wheeled structure and having connection with the towing bar for effecting its movement over the supporting means, one end of said towing bar being normally disposed adjacent the ground at the rear of the wheeled structure, and means carried upon the towing bar at the said one end for engaging the axle of a vehicle to raise the same as the towing bar is drawn forwardly over said supporting means, the said axle engaging means being designed to oscillate with the axle on an axis extending transversely of the towing bar.

6. A towing structure of the character described, comprising a wheeled carriage, a pair of roller members carried by the carriage at longitudinally spaced points thereon, the said rollers being arranged to rotate about axes extending transversely of the carriage, a longitudinally arcuate tow bar extending longitudinally of the carriage and disposed over one of said rollers and beneath the other one thereof, means upon the carriage for shifting said tow bar longitudinally thereof in contact with said rollers, said tow bar being arranged to extend rearwardly and downwardly from the carrying vehicle, and means mounted upon the rear end of the tow bar for gripping the axle of a motor vehicle, the said means being designed to permit oscillation of the axle relative to the tow bar as the axle is being lifted thereby, without twisting the axle.

In testimony whereof I hereunto affix my signature.

FRED BONGE.